United States Patent [19]

Cooper

[11] 4,069,100
[45] Jan. 17, 1978

[54] ADSORPTION SEAL FOR NUCLEAR REACTORS

[75] Inventor: Martin H. Cooper, Monroeville, Pa.

[73] Assignee: Westinghouse Electric Corporation, Pittsburgh, Pa.

[21] Appl. No.: 549,570

[22] Filed: Feb. 13, 1975

[51] Int. Cl.² .............................................. G21C 9/00
[52] U.S. Cl. ........................................ 176/37; 176/87
[58] Field of Search ............................ 176/37, 38, 87; 220/378

[56] References Cited

U.S. PATENT DOCUMENTS

| 3,141,829 | 7/1964 | Fortescue | 176/37 |
|---|---|---|---|
| 3,252,869 | 5/1966 | Kloutz | 176/68 |
| 3,274,066 | 9/1966 | Zumwalt | 176/68 |
| 3,356,580 | 12/1967 | Bell et al. | 176/37 |
| 3,356,585 | 12/1967 | Zebroski | 176/68 |
| 3,406,863 | 10/1968 | Wenzel et al. | 220/46 |
| 3,406,864 | 10/1968 | Schmidt | 220/46 |
| 3,519,537 | 7/1970 | Ferrari | 176/68 |
| 3,698,724 | 10/1972 | Blachere | 277/34.3 |

FOREIGN PATENT DOCUMENTS 1,921,377  11/1970  Germany ................................ 176/87

Primary Examiner—Samuel W. Engle
Assistant Examiner—Ralph Palo
Attorney, Agent, or Firm—M. S. Yatsko; Z. L. Dermer

[57] ABSTRACT

A system for reducing the possibility of leakage of fission gases from a nuclear reactor of the gas-cooled type or of a type utilizing a liquid coolant, for example a liquid metal with a cover gas above free surfaces of the coolant. The disclosed system reduces the leakage of fission gases from the cover gas through joints between a pressure vessel and a pressure vessel head in the nuclear reactor by installing an adsorbent material between two seals placed in the joints. This adsorbent material provides sufficient delay time to allow all radioactive isotopes, except long-lived nuclides, to decay to innocuous concentrations before escaping from the pressure vessel.

5 Claims, 4 Drawing Figures

ADSORPTION SEAL FOR NUCLEAR REACTORS

BACKGROUND OF THE INVENTION

This invention relates generally to nuclear reactors and more particularly to a system for preventing or reducing the leakage out of a contained vessel of fission gases in a gas-cooled nuclear reactor or a liquid cooled nuclear reactor having a cover gas above free surfaces of the reactor coolant.

A nuclear reactor produces heat by fissioning of nuclear materials which are fabricated into fuel elements and assembled within a nuclear core situated in a pressure vessel. In commercial nuclear reactors, the heat produced thereby is used to generate electricity. Such nuclear reactors typically comprise one or more primary flow and heat transfer systems and a corresponding number of secondary flow and heat transfer systems to which the conventional steam turbines and electrical generators are coupled. A typical energy conversion process for a commercial nuclear reactor, therefore, involves transfer of heat from a nuclear core to the primary coolant flow system, then to a secondary coolant flow system, and finally into steam from which electricity is generated.

In a liquid cooled nuclear reactor, such as a liquid metal cooled breeder reactor, a reactor coolant, such as liquid sodium, is circulated through the primary coolant flow system. A typical primary system comprises a nuclear core within a reactor vessel, a heat exchanger, a circulating pump, and piping interconnecting the aforementioned apparatus. In nuclear reactors having more than one primary system, the nuclear core and reactor pressure vessel are common to each of the primary systems. The heat generated by the nuclear core is removed by the reactor coolant which flows into the reactor vessel and trough the reactor core. The heated reactor coolant then exits from the reactor vessel and flows to the heat exchangers which transfer the heat to secondary flow systems associated therewith. The cooled reactor coolant exits from the heat exchanger, then flows to a pump which again circulates the coolant into the pressure vessel, repeating the described flow cycle.

Above the free surfaces of the reactor coolant in the pressure vessel, it is general practice to provide a blanket of inert gas. This gas blanket, normally termed the cover gas, prevents undesirable chemical reactions of liquid metal coolant with constituents of the atmosphere, i.e., oxygen and moisture. In addition, certain components, such as the control rod drive mechanisms, are designed to function in an inert gas atmosphere. To maintain a safer and more efficient operation, this cover gas is maintained at a low positive differential pressure above atmospheric pressure. The circulating pumps of liquid metal-cooled reactors also utilize a cover gas. Here, the cover gas prevents contact of the pump motor and pump seals with the liquid metal coolant. In nuclear reactors equipped with coolant reservoir tanks, a cover gas is generally used above the level of coolant in these tanks.

This cover gas should be maintained in a gas-tight containment area. This is generally accomplished by means of welded or bellows-sealed joints. Certain locations, however, cannot be sealed solely by such means. These locations, such as the joint formed by the pressure vessel and the vessel closure head, must utilize a sealing mechanism to form a gas-tight containment area. The maintenance of such a gas-tight containment area is necessitated by the possibility of a defect in a fuel assembly.

If a defect, such as a crack, occurred in a fuel assembly, radioactive isotopes such as xenon and krypton may be released into the reactor coolant. As these radioactive isotopes have low solubility in sodium, they would flow upward through the coolant and emerge into the cover gas. Without a gas-tight containment area, these radioactive isotopes, or fission gases, could escape into the surrounding environment.

The prior art attempted to solve this problem by utilizing a conventional seal in the joints. This method is not entirely satisfactory. Experimental results have indicated that the cover gas continues to leak through such conventional seals.

Another method employed in the prior art was the use of a buffer gas system. This buffer gas system utilizes a pressurized gas flowing in a channel between such joints. Because this gas is at a higher pressure than the cover gas, any leakage which might occur is forced back into the cover gas containment area by the pressurized gas. A major disadvantage of this system is that many small gas lines are required to supply the pressurized gas flowing in the channel. This buffer gas system adds unwanted complexity to an already crowded area.

A third means of providing a gas-tight containment area for the cover gas is the use of a bellows seal. This bellows seal works satisfactorily in that it prevents all gases from leaking through the joints. The bellows seal has disadvantages, however, in that bellows seals are difficult and expensive to fabricate when the size of the seal required becomes large (approximately 12 inches or more).

This invention provides a system to remove any short-lived radioactive isotopes in the cover gas which could possibly leak to the external environment through the various joints. This system functions for large sealing locations, and does not add substantial additional complexity to the nuclear reactor.

SUMMARY OF THE INVENTION

Briefly stated, the above disadvantages of the prior art are eliminated by this invention by providing a sealing system by which radioactive isotopes, or fission gases, in the unlikely event of leakage through joints in a nuclear reactor, are reduced to negligible concentrations. At least two seals are placed in any joint through which leakages may occur and an adsorbent material is placed in the volume between such seals. This adsorbent material provides sufficient delay of the fission gas to allow any radioactive isotopes contained therein to decay to acceptable standards before the gas has an opportunity to escape to the external environment.

BRIEF DESCRIPTION OF THE DRAWINGS

For a better understanding of the invention, reference may be had to the preferred embodiment, taken in connection with the accompanying drawings, in which.

DESCRIPTION OF THE PREFERRED EMBODIMENT

Figure 1:
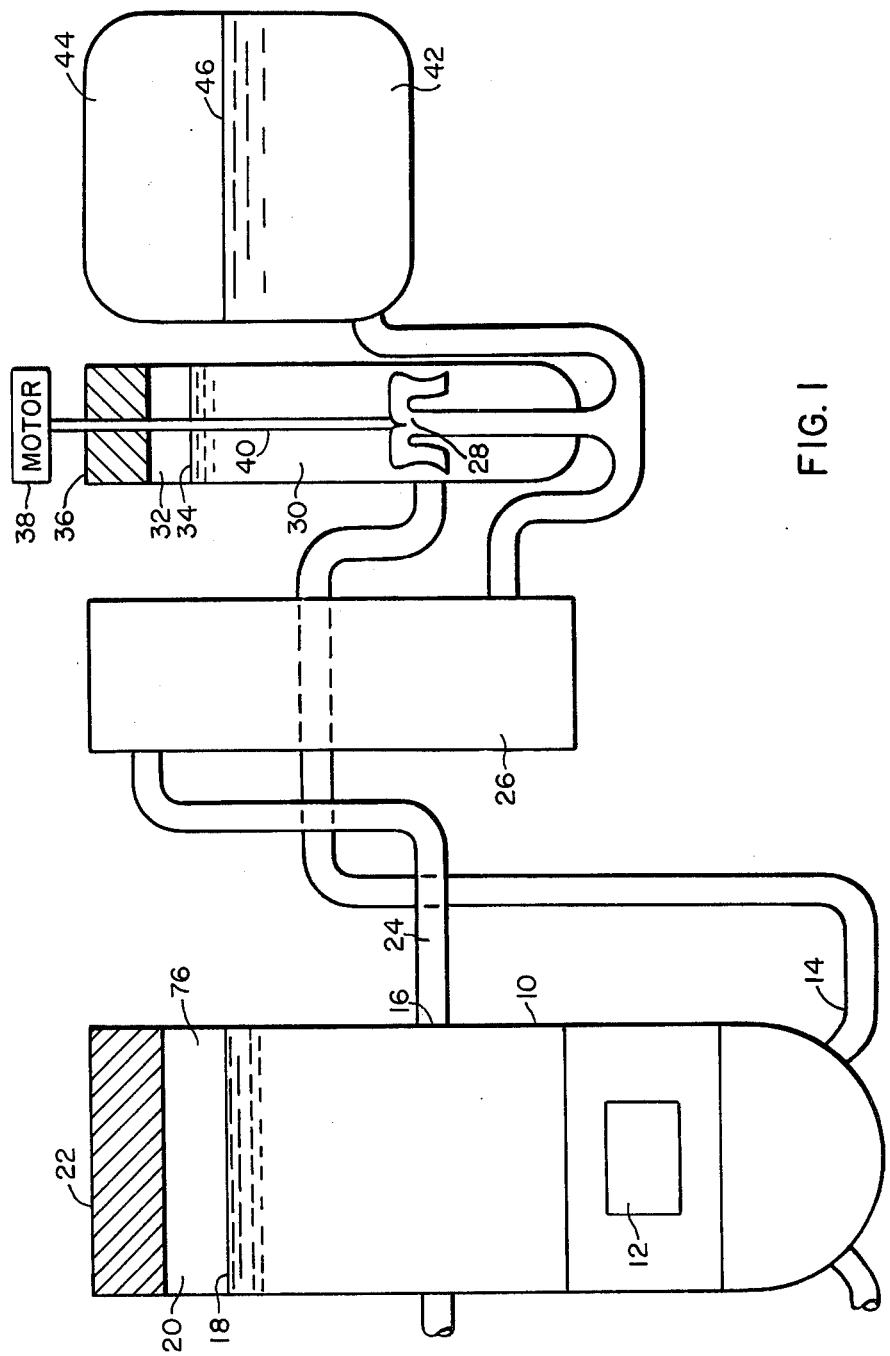
FIG. 1 is a schematic of a primary coolant flow system of a liquid metal-cooled nuclear reactor having a pump and a separate reactor coolant reservoir.

Throughout the description which follows, like reference characters indicate like elements of various figures of the drawings.

FIG. 1 of the drawings illustrates a typical nuclear reactor system which may employ the principles of this invention. A cylindrical enclosure, known generally as a nuclear reactor pressure vessel 10, houses a nuclear core 12. The core 12 is comprised mainly of a plurality of clad nuclear fuel elements (not shown) which generates substantial amounts of heat. The reactor pressure vessel 10 has coolant flow inlet means 14 and coolant flow outlet means 16 formed integral with and through its cylindrical walls. During reactor operation, the reactor pressure vessel 10 is filled with a quantity of reactor coolant such as liquid sodium to the level schematically illustrated and designated by the numeral 18. In the type of reactor considered herein, the reactor coolant comprises liquid sodium.

A quantity of inert gas 20, known generally as cover gas, occupies the space 76 within the reactor pressure vessel 10 above the level of reactor coolant 18 at a positive differential pressure above atmospheric pressure. Typically, this cover gas 20 may be comprised of helium, nitrogen, argon, or some other like inert gas which does not adversely react with the reactor coolant or interfere with various aspects of reactor operation such as detection of leaks in reactor apparatus. A confinement means for the pressure vessel 10, such as a pressure vessel closure head 22 is utilized to seal the reactor pressure vessel 10.

The heat generated by the reactor core 12 is conveyed from the core 12 by coolant flow entering through inlet means 14 and exiting through outlet means 16. The hot reactor coolant flow exiting through outlet means 16 is conveyed through a portion of interconnecting piping 24 and into heat exchanger 26. The hot reactor coolant transfers the heat it previously acquired from the nuclear core 12 to a fluid of another system (not shown) in heat exchanger 26. Cooled reactor coolant exits from heat exchanger 26 and enters the inlet of a primary coolant circulating pump 28 of a construction well known in the art. The pump 28 illustrated in FIG. 1 is classified as a cold leg pump, in that it pumps cooled reactor coolant. Without modifying the practice of this invention, the pump 28 could be installed as a hot leg pump, that is, it could be connected between the coolant flow outlet means 16 of a pressure vessel 10 and the heat exchanger 26. In this location, the pump 28 would circulate hot reactor coolant.

The pump 28 is housed in an enclosure 30. In a manner similar to the reactor pressure vessel 10, enclosure 30 is partially filled with reactor coolant and has a cover gas 32 above the level 34 of the reactor coolant therein. The enclosure 30 is sealed by a plug 36. The circulating pump 28 is driven by motor 38 which is located external of the enclosure 30. A shaft 40 extends from the pump 28 through the reactor coolant 34, through the cover gas 32, through the plug 36, to the motor 38. The pump 28 circulates the cooled reactor coolant back into the reactor pressure vessel 10 through inlet means 14.

A reactor coolant reservoir tank 42 is included within the illustrated primary system. Reservoir tank 42 is not serially connected to the primary flow system; reactor coolant which is contained in reservoir tank 42 only incidentally flows through the primary system. An inert cover gas 44 is utilized above the level 46 of reactor coolant within the reservoir tank 42.

Although FIG. 1 only shows one primary coolant flow system of a nuclear reactor, it would be appreciated by one skilled in the art that the invention is not to be limited thereby. The invention may be equally applied to a reactor having any number of primary coolant flow systems, and to a gas-cooled nuclear reactor. As can be seen, there are numerous locations where gas must be maintained in gas-tight containment areas.

Figure 2:
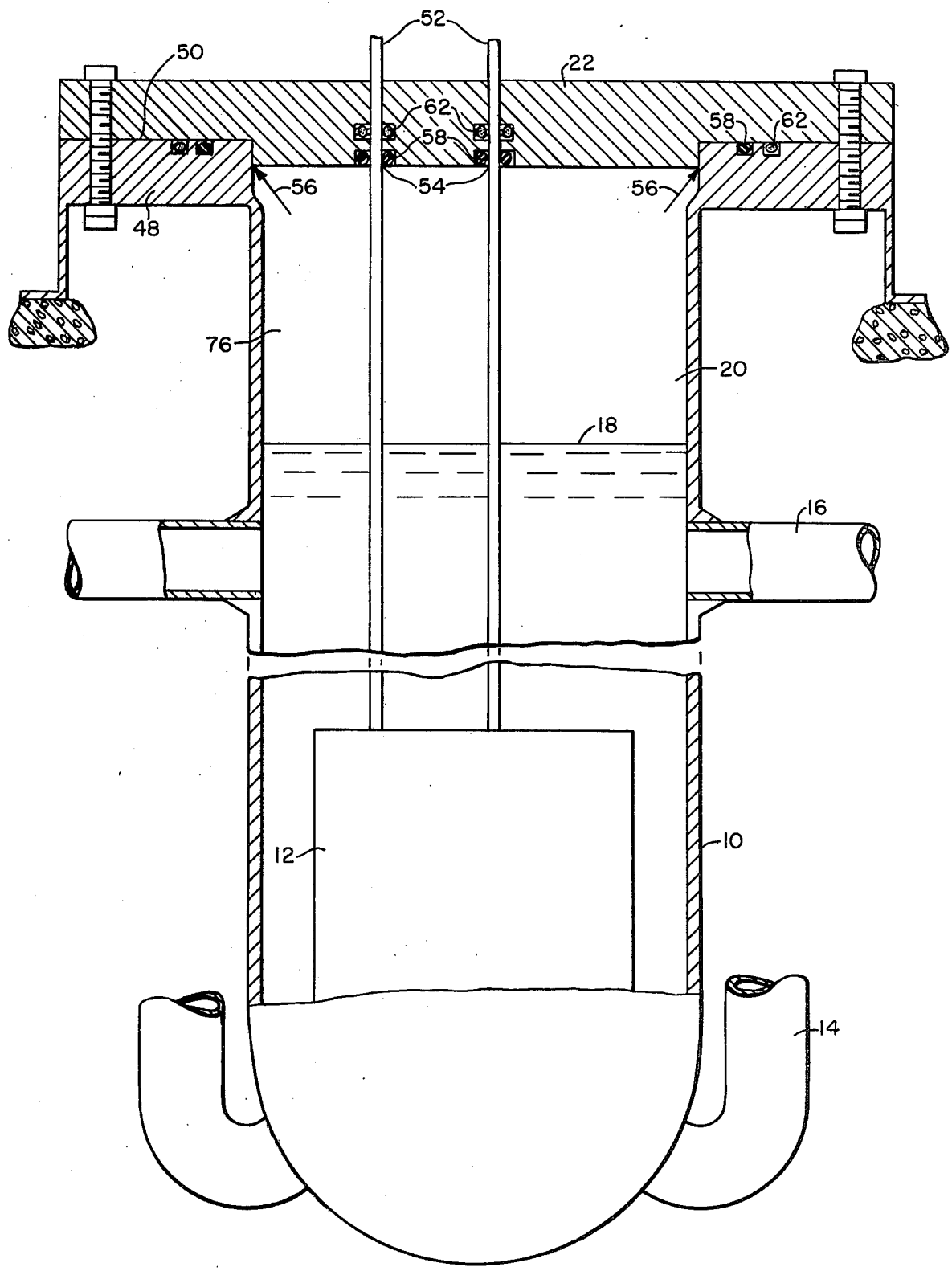
FIG. 2 is an enlarged view of the reactor pressure vessel.

FIG. 2 illustrates a typical location where the invention may be practiced. The reactor pressure vessel closure head 22 is secured to the flange 48 of the reactor pressure vessel 10, forming a joint 50. Within the area formed by the jointure of the pressure vessel 10 and the closure head 22, above the level of liquid coolant 18, a gas-tight containment area 76 must be maintained to contain the cover gas 20.

During reactor operation, it will be necessary for certain reactor apparatus to pass through the closure head 22 of the reactor vessel 10 and extend to the core 12 therein. These penetrations 52, such as control rods or thermocouples, form joint 54 with the pressure vessel closure head 22 and must be sealed to maintain a gas-tight containment area 76 for the cover gas 20.

Figure 3:
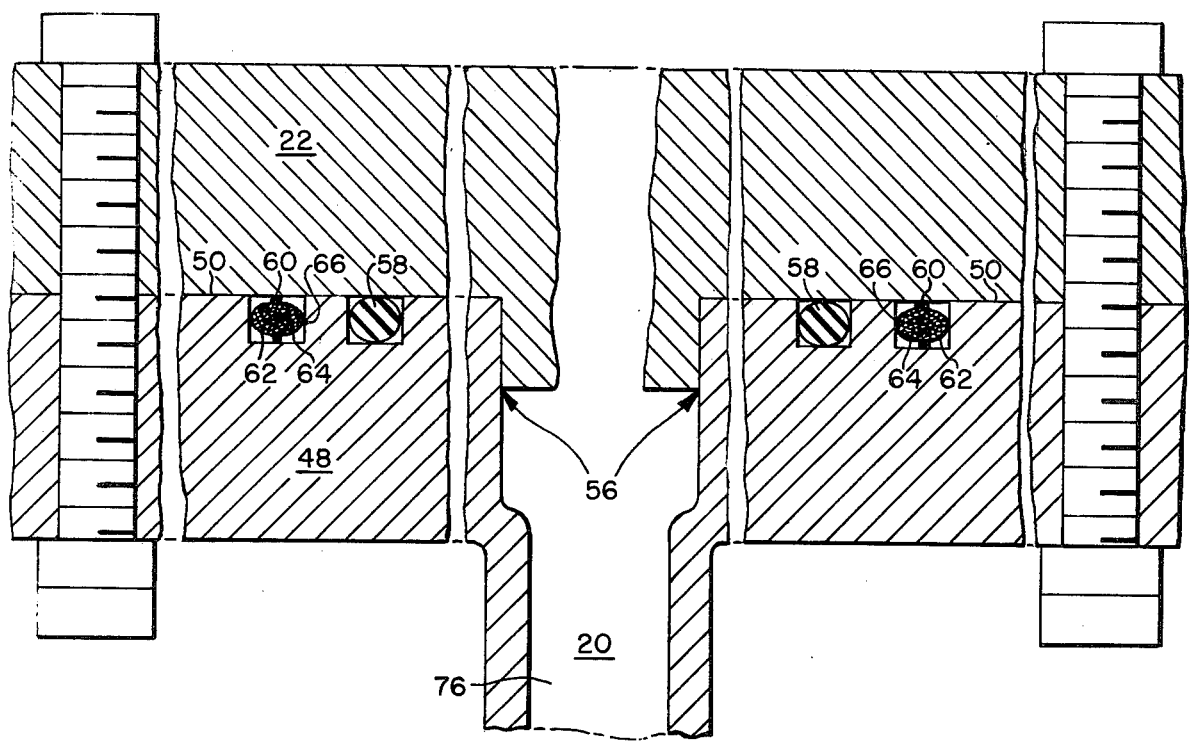
FIG. 3 is an enlarged view of a joint between a nuclear reactor pressure vessel and a cover for the vessel.

FIG. 3 is an enlarged view of the joint 50 formed by the jointure of the flange 48 of the pressure vessel 10 and the pressure vessel closure head 22. The cover gas 20 in a containment area 76, such as the interior of the pressure vessel 10 flowing along paths 56, must be prevented from leaking through joint 50 and releasing any fission gases present into the external environment.

A preferred method of practicing the invention is to install a conventional seal 58, such as an O-ring, made of a material such as elastomer, into the joint 50 between the pressure vessel closure head 22 and the flange 48. Outward of this seal 58 in the direction of any leakage flow 56 of the cover gas 20 from a containment area 76, such as the interior of pressure vessel 10, an annular container 62, continuous in its length, and having means for facilitating the flow of gas 56 through the container 62 such as screens or perforations (not shown) is installed between the pressure vessel closure head 22 and the flange 48 outwardly of O-ring 58. The container 62 is equipped with bypass seals 60, of a material such as elastomer, to prevent the bypass flow of fission gases around the container 62. The container 62 is filled with an adsorbent material 64 such as activated charcoal, silica gels, bone chars, or zeolites. As can be seen from the drawing, any fission gases present in the cover gas 20 must flow along the direction of flow line 56, pass through a first seal 58, and then pass through the adsorbent material 64 in the container 62 outward of the first seal 58, before it can enter the external environment. The adsorbent 64 delays the movement of any fission gases, such as xenon and krypton, for a time sufficient to allow these gases, with the exception of long-lived nuclides, (such as $85_{Kr}$ and $3_H$) to decay to innocuous concentrations.

For an example of the delay times to be expected, calculations were made based on experimental data. The calculations were made for the joint 50 between the pressure vessel closure head 22 and the flange 48 with the seal 58 being an O-ring. The volume of adsorbent material 64 was found to be 276 cubic centimeters.

Using PCB 12 × 60 activated charcoal, with a density of 0.45 grams per cubic centimeter, as the adsorbent 64, a mass of 124 grams was needed. The carrier gas leakage flow 56 was found to be $7.08 \times 10^{-5}$ standard cubic centimeters per second. Using these data, delay times for xenon at 400° F were calculated to be 0.645 years. At 150° F, delay times of 13.89 years could be expected. For krypton, a delay time of 0.234 years could be expected at 400° F, and 1.66 years at 150° F. From these times, it can be seen that any fission gases which may be leaking out of the containment area 76, with the exception of long-lived nuclides such as $85_{Kr}$, with a half-life of 10.8 years, and $3_H$, with a half-life of 12 years, will be delayed for a time sufficient to decay to innocuous concentrations.

This manner of practicing the invention can also be utilized in the joint 54 formed by the penetrations 52, FIG. 2 and the pressure vessel closure head 22. Here, instead of a leakage flow of gas 56 being horizontally outward, any leakage flow of gas 56 is vertically outward. The invention is then practiced with the first seal 58 being vertically below the container 62 of adsorbent material 64. The perforations on the inward side 66 still remain between the first seal 58 and the bypass flow seals 60.

Figure 4:
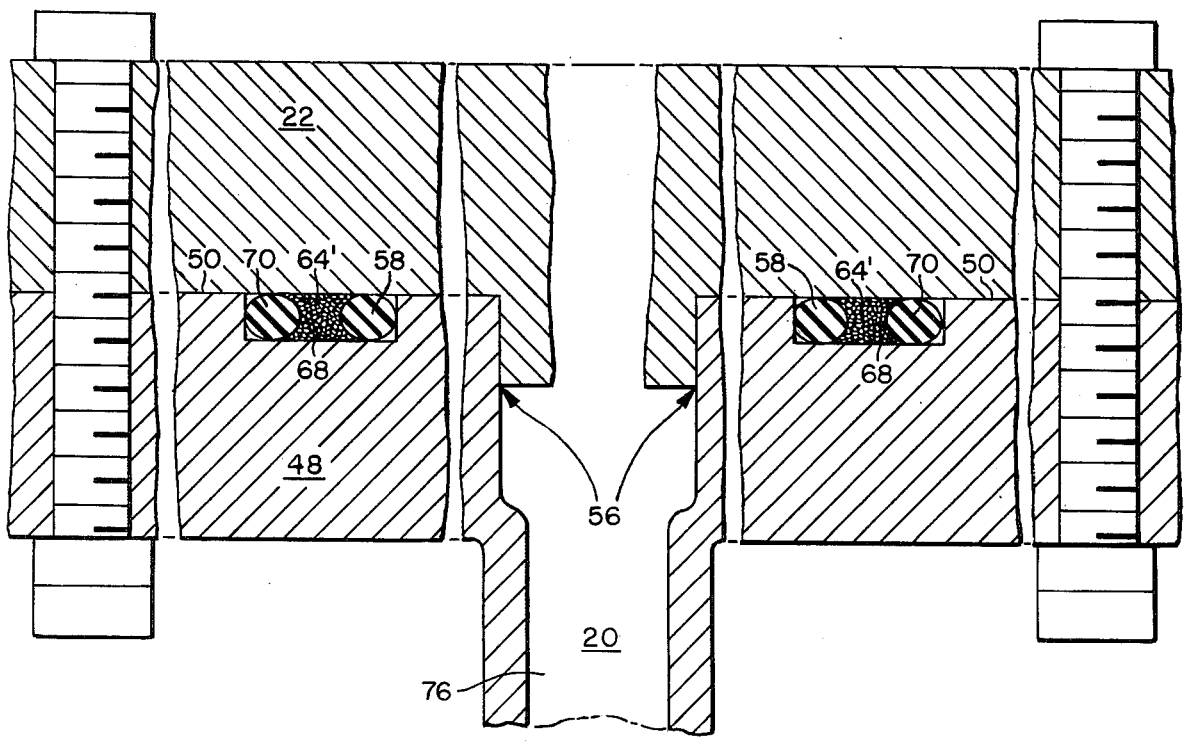
FIG. 4 is an enlarged view of an alternate form of a joint between a nuclear reactor pressure vessel and the head for the pressure vessel.

FIG. 4 shows another method of practicing the teachings of this invention. The joint 50, formed by the jointure of the pressure vessel closure head 22 and the flange 48 of pressure vessel 10 is illustrated. A first conventional seal 58, such as an O-ring, made of a material such as elastomer, is installed in this joint 50. Outwardly of this first seal 58 in the direction of flow 56 of any leakages of cover gas 20 from the cover gas containment area 76, a second conventional seal 70 of a material such as elastomer, is installed in the joint 50. In the volume 68 between the two seals 58 and 70, an adsorbent material 64' such as activated charcoals is installed. Any leakage of fission gas must then flow along the paths indicated by the arrows 56 through the first seal 58, through the adsorbent material 64', and through the second seal 70 before it can emerge into the external environment. As with the preceding embodiment, the adsorbent material delays any leakages of fission gas for a time sufficient to allow all but the long-lived nuclides to decay to innocuous concentrations.

Thus, the invention teaches a system by which leakage of fission gases can be reduced to innocuous concentrations without adding complexity to the nuclear reactor.

I claim:

1. A system for reducing the leakage of fission gases from a nuclear reactor comprising:
   an enclosure,
   means for containment of material within said enclosure,
   a first seal installed between said enclosure and said containment means;
   a continuous container installed between said enclosure and said containment means outwardly from said first seal, said continuous container having a plurality of openings therein directed inwardly towards said first seal;
   a first bypass seal coupled to said continuous container and disposed between said continuous container and said containment means;
   a second bypass seal coupled to said continuous container and disposed between said continuous container and said enclosure, said continuous container openings being disposed intermediate said first seal and said bypass seals; and
   a fission gas adsorbing material disposed within said continuous container, said fission gas adsorbing material delaying the passage of gases leaking through said first seal and passing through said continuous container openings.

2. The system according to claim 1 wherein said fission gas adsorbing material is material with a high surface area and a high adsorption activity area.

3. The system according to claim 1 wherein said fission gas adsorbing material is a material selected from the group consisting of activated charcoal, silica gels, bone chars, and zeolites.

4. A system for reducing the leakage of fission gases from a nuclear reactor comprising:
   a nuclear reactor pressure vessel;
   a pressure vessel closure head secured to said pressure vessel;
   a first seal installed between said pressure vessel and said closure head;
   a continuous container installed between said pressure vessel and said closure head, outwardly from said first seal, said continuous container having a plurality of openings therein directed inwardly towards said first seal;
   a first bypass seal coupled to said continuous container and disposed between said continuous container and said pressure vessel;
   a second bypass seal coupled to said continuous container and disposed between said continuous container and said closure head, said continuous container openings being disposed intermediate said first seal and said bypass seals; and
   a fission gas adsorbing material disposed within said continuous container, said fission gas adsorbing material delaying the passage of gases leaking through said first seal and passing through said continuous container openings .

5. The system according to claim 4 wherein said fission gas adsorbing material is a material selected from the group consisting of activated charcoal, silica gels, bone chars, and zeolites.

* * * * *